US012596862B1

(12) United States Patent
Lamant et al.

(10) Patent No.: US 12,596,862 B1
(45) **Date of Patent: *Apr. 7, 2026**

(54) METHOD AND SYSTEM TO IMPLEMENT A COMPOSITE, MULTI-DOMAIN MODEL FOR ELECTRO-OPTICAL MODELING AND SIMULATION

(71) Applicants: Cadence Design Systems, Inc., San Jose, CA (US); Ansys, Inc., Canonsburg, PA (US)

(72) Inventors: Gilles Simon Claude Lamant, Sunnyvale, CA (US); James Frederick Pond, Vancouver (CA); Jackson Klein, North Vancouver (CA); Zeqin Lu, Vancouver (CA); Ahmadreza Farsaei, San Jose, CA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,353

(22) Filed: Mar. 13, 2024

Related U.S. Application Data

(63) Continuation of application No. 17/572,454, filed on Jan. 10, 2022, now Pat. No. 11,960,809, which is a continuation of application No. 16/231,477, filed on Dec. 22, 2018, now Pat. No. 11,256,841.

(60) Provisional application No. 62/639,469, filed on Mar. 6, 2018.

(51) Int. Cl.
*G06F 30/367* (2020.01)
*G06F 21/62* (2013.01)

(52) U.S. Cl.
CPC ............ *G06F 30/367* (2020.01); *G06F 21/62* (2013.01)

(58) Field of Classification Search
CPC ............................... G06F 30/367; G06F 21/62
USPC .......................................................... 703/14
See application file for complete search history.

(56) References Cited

U.S. PATENT DOCUMENTS

| | | | | |
|---|---|---|---|---|
| 7,251,386 B1 * | 7/2007 | Dickinson | .............. | H04B 10/25 385/24 |
| 7,408,649 B2 * | 8/2008 | Freischlad | ........... | G01B 9/0209 356/497 |
| 7,574,336 B1 * | 8/2009 | Jackson | .................. | G06F 30/00 703/2 |
| 7,574,342 B2 * | 8/2009 | Kundert | ................ | G06F 30/367 703/13 |

(Continued)

FOREIGN PATENT DOCUMENTS

EP          2928098 A1 * 10/2015          ............. H04B 10/27

OTHER PUBLICATIONS

Andras Poppe ("Simulation of LED based luminaires by using multi-domain compact models of LEDs and compact thermal models of their thermal environment", Microelectronics Reliability 72 (2017) 65-74) (Year: 2017).*

(Continued)

*Primary Examiner* — Iftekhar A Khan

(57) ABSTRACT

Provided is an improved method, system, and computer program product to implement simulation for photonic devices. A composite, multi-domain simulation model is disclosed, with connected domain-specific representations that allow the use of the most relevant simulator technology for a given domain. The model has external connection points either expressed as actual ports or virtual ones, embodied by simulator API calls in the model.

20 Claims, 16 Drawing Sheets

(56)                References Cited

U.S. PATENT DOCUMENTS

| | | | | |
|---|---|---|---|---|
| 8,023,781 | B2 * | 9/2011 | Nara | G02B 6/29355 |
| | | | | 385/24 |
| 8,286,111 | B2 * | 10/2012 | Chandra | G01K 7/425 |
| | | | | 716/110 |
| 8,387,005 | B1 * | 2/2013 | Ghosh-Roy | G06F 8/34 |
| | | | | 717/109 |
| 8,397,214 | B2 * | 3/2013 | Hudson, III | G06F 8/34 |
| | | | | 717/109 |
| 8,543,976 | B1 * | 9/2013 | Ghosh-Roy | G06F 8/34 |
| | | | | 717/109 |
| 8,577,652 | B2 * | 11/2013 | Oh | G06F 30/20 |
| | | | | 703/6 |
| 8,732,636 | B2 * | 5/2014 | Ginetti | G06F 30/33 |
| | | | | 716/109 |
| 8,762,906 | B2 * | 6/2014 | Ginetti | G06F 30/367 |
| | | | | 716/109 |
| 9,330,211 | B2 * | 5/2016 | Papariello | G06F 30/20 |
| 10,181,059 | B1 * | 1/2019 | Brewton | G06F 8/20 |
| 10,185,799 | B2 * | 1/2019 | Cao | G06F 30/398 |
| 10,331,808 | B1 * | 6/2019 | Kanthasamy | G06F 30/367 |
| 10,387,771 | B2 * | 8/2019 | Judd | G06N 3/049 |
| 10,527,920 | B1 * | 1/2020 | Wo | G03B 21/56 |
| 10,650,110 | B2 * | 5/2020 | Van Vaerenbergh | G02B 6/43 |
| 10,719,645 | B1 * | 7/2020 | Zhang | G06F 11/3608 |
| 10,740,514 | B1 * | 8/2020 | Zhang | G06F 30/3308 |
| 11,256,841 | B1 * | 2/2022 | Lamant | G06F 21/62 |
| 2002/0044316 | A1 * | 4/2002 | Myers | H04J 14/002 |
| | | | | 398/43 |
| 2002/0046009 | A1 * | 4/2002 | Devaquet | G05B 17/02 |
| | | | | 703/1 |
| 2002/0080436 | A1 * | 6/2002 | Hait | H04J 14/02 |
| | | | | 398/53 |
| 2002/0080450 | A1 * | 6/2002 | Hait | G02B 6/2938 |
| | | | | 398/43 |
| 2003/0072051 | A1 * | 4/2003 | Myers | H04J 14/002 |
| | | | | 398/43 |
| 2007/0091317 | A1 * | 4/2007 | Freischlad | G01B 9/0209 |
| | | | | 356/497 |
| 2013/0125092 | A1 * | 5/2013 | Liu | G06F 8/60 |
| | | | | 717/108 |
| 2013/0125093 | A1 * | 5/2013 | Mandava | G06F 8/20 |
| | | | | 717/108 |
| 2014/0019104 | A1 * | 1/2014 | Martinez Canedo | G06F 30/20 |
| | | | | 703/6 |
| 2014/0306581 | A1 * | 10/2014 | Garland | C30B 29/32 |
| | | | | 117/7 |
| 2016/0078648 | A1 * | 3/2016 | Gagnon | G06F 8/34 |
| | | | | 345/619 |
| 2016/0085888 | A1 * | 3/2016 | Soukhostavets | G06F 30/20 |
| | | | | 703/2 |
| 2017/0177773 | A1 * | 6/2017 | Martinez Canedo | G06F 30/20 |
| 2018/0074386 | A1 * | 3/2018 | Chung | G02F 1/3136 |
| 2020/0125931 | A1 * | 4/2020 | Judd | G06N 3/063 |
| 2020/0158650 | A1 * | 5/2020 | Ryckman | G01N 21/7703 |

OTHER PUBLICATIONS

Yinghao Ye et al. (Numerical modeling of a linear photonic system for accurate and efficient time-domain simulations, Photonics Research, 2018, pp. 560-573) (Year: 2018).

Chen Sun et al. (DSENT—A Tool Connecting Emerging Photonics with Electronics for Opto-electronic Networks-on-Chip Modeling, IEEE, 2012, pp. 201-210) (Year: 2012).

Alexeev, A., et al. "Requirements Specification for Multi-Domain LED Compact Model Development in Delphi4LED." 2017 18th International Conference on Thermal, Mechanical and Multi-Physics Simulation and Experiments in Microelectronics and Microsystems (EuroSimE), 2017, doi: 10.1109/eurosime.2017. 7926296 (Year: 2017).

Faruque, M.O., et al. "Interfacing Issues in Multi-Domain Simulation Tools." IEEE Transactions on Power Delivery, vol. 27, No. 1, 2012, pp. 439-448., doi: 10.1109/tpwrd.2011.2170861 (Year: 2012).

* cited by examiner

202 — GENERATE MULTI-DOMAIN MODEL CORRESPONDING TO DESIGN

204 — PERFORM SIMULATION WITH DOMAIN-SPECIFIC SIMULATION TOOLS

206 — FINALIZE DESIGN

208 — MANUFACTURE PRODUCT

702

ELECTRICAL
IN/OUT FOR
THERMAL
PHASE
SHIFTER 1

ELECTRICAL     ELECTRICAL
IN/OUT S1       GROUND

OPTICAL INPUT
(BIDIRECTIONAL)

MACH-ZEHNDER
MODULATOR

OPTICAL OUTPUT
(BIDIRECTIONAL)

ELECTRICAL
IN/OUT S2

ELECTRICAL
IN/OUT FOR
THERMAL PHASE
SHIFTER 2

ELECTRICAL
SIGNAL
FOR PID
CONTROL

802

MZM

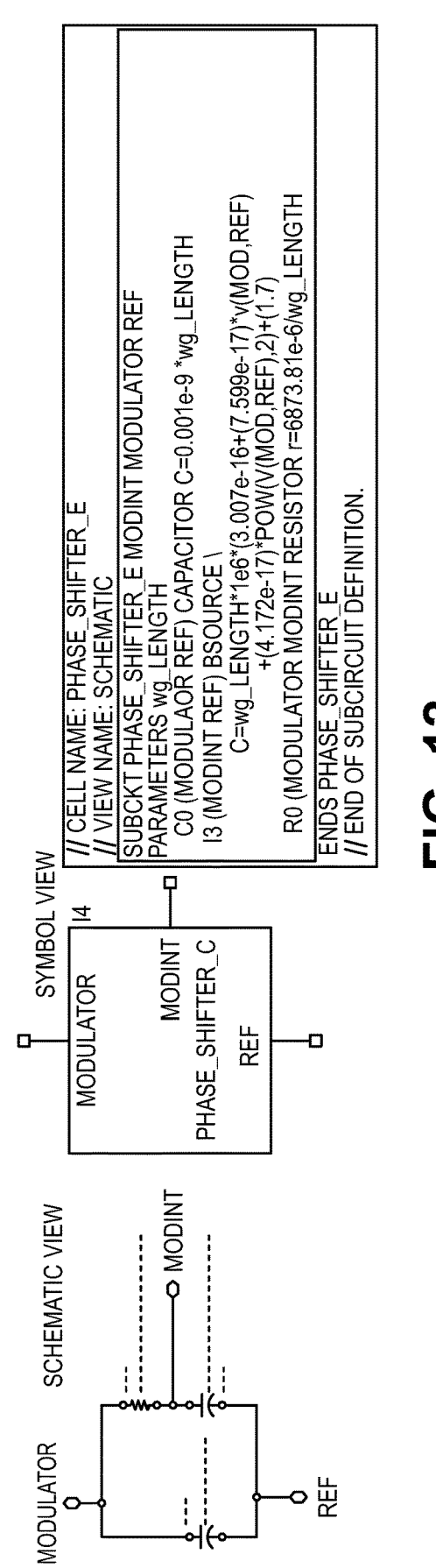

// CELL NAME: PHASE_SHIFTER_E
// VIEW NAME: SCHEMATIC

SUBCKT PHASE_SHIFTER_E MODINT MODULATOR REF
PARAMETERS wg_LENGTH
C0 (MODULAOR REF) CAPACITOR C=0.001e-9 *wg_LENGTH
I3 (MODINT REF) BSOURCE \
    C=wg_LENGTH*1e6*(3.007e-16+(7.599e-17)*v(MOD,REF)
    +(4.172e-17)*POW(V(MOD,REF),2)+(1.7)
R0 (MODULATOR MODINT RESISTOR r=6873.81e-6/wg_LENGTH

ENDS PHASE_SHIFTER_E
// END OF SUBCIRCUIT DEFINITION.

SYMBOL VIEW

I4

MODULATOR

MODINT

PHASE_SHIFTER_C

REF

1204

SCHEMATIC VIEW

MODINT

MODULATOR

REF

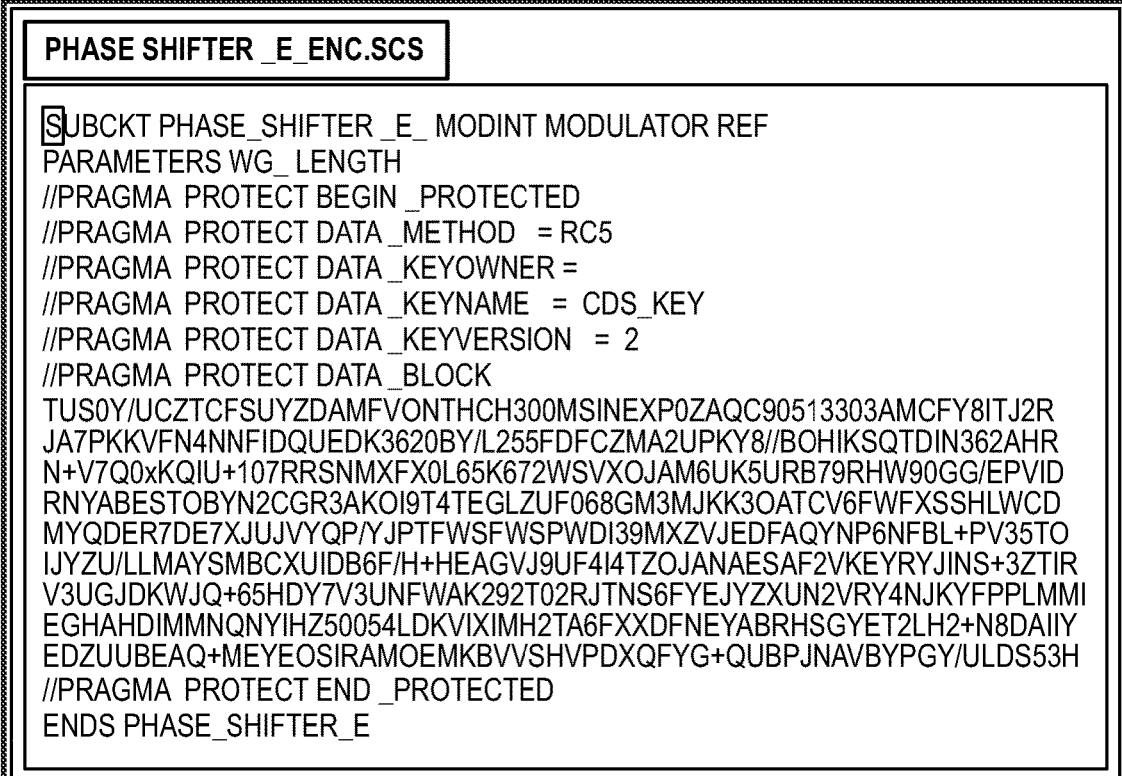

```
PHASE SHIFTER _E_ENC.SCS

SUBCKT PHASE_SHIFTER _E_ MODINT MODULATOR REF
PARAMETERS WG_ LENGTH
//PRAGMA PROTECT BEGIN _PROTECTED
//PRAGMA PROTECT DATA _METHOD  = RC5
//PRAGMA PROTECT DATA _KEYOWNER =
//PRAGMA PROTECT DATA _KEYNAME  = CDS_KEY
//PRAGMA PROTECT DATA _KEYVERSION  = 2
//PRAGMA PROTECT DATA _BLOCK
TUS0Y/UCZTCFSUYZDAMFVONTHCH300MSINEXP0ZAQC90513303AMCFY8ITJ2R
JA7PKKVFN4NNFIDQUEDK3620BY/L255FDFCZMA2UPKY8//BOHIKSQTDIN362AHR
N+V7Q0xKQIU+107RRSNMXFX0L65K672WSVXOJAM6UK5URB79RHW90GG/EPVID
RNYABESTOBYN2CGR3AKOI9T4TEGLZUF068GM3MJKK3OATCV6FWFXSSHLWCD
MYQDER7DE7XJUJVYQP/YJPTFWSFWSPWDI39MXZVJEDFAQYNP6NFBL+PV35TO
IJYZU/LLMAYSMBCXUIDB6F/H+HEAGVJ9UF4I4TZOJANAESAF2VKEYRYJINS+3ZTIR
V3UGJDKWJQ+65HDY7V3UNFWAK292T02RJTNS6FYEJYZXUN2VRY4NJKYFPPLMMI
EGHAHDIMMNQNYIHZ50054LDKVIXIMH2TA6FXXDFNEYABRHSGYET2LH2+N8DAIIY
EDZUUBEAQ+MEYEOSIRAMOEMKBVVSHVPDXQFYG+QUBPJNAVBYPGY/ULDS53H
//PRAGMA PROTECT END _PROTECTED
ENDS PHASE_SHIFTER_E
```

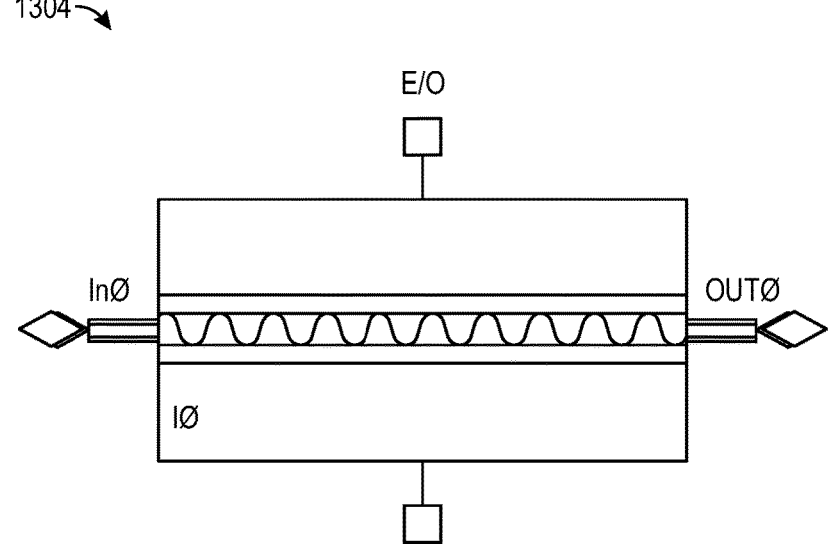

E/O

Inø          OUTø

1502

```
//DESIGN VIEW NAME: SCHEMATIC
SIMULATOR LANG=SPECTRE
GLOBAL 0              INCLUDE THE ENCRYPTED ELECTRICAL SUB-CIRCUITS
INCLUDE "/EXPORT/HOME [_____] /PROJECTS/NS2017/ [_____] /PHASE_SHIFTER_E_ENC.SCA"

// LIBRARY NAME: [_____]

// CELL NAME: PHASE_SHIFTER_E0

// VIEW NAME: SCHEMATIC

SUBCKT PHASE_SHIFTER_E0 In0 MODULATOR OUT0 REF

PARAMETER wg_LENGTH_1000u

I4 (NET 5 MODULATOR REF) PHASE_SHIFTER_E wg_LENGTH" wg_LENGTH

ENDS PHASE_SHIFTER_E0

// END OF SUBCIRCUIT DEFINITION.
                                    TOP SUB-CIRCUIT STRIPS THE OPTICAL MODEL

// LIBRARY NAME: [_____]

// CELL NAME: PHASE_SHIFTER_E0_TESTBENCH

// VIEW NAME: SCHEMATIC

I0 ( NET01 NET4 NET02 NET03 ) PHASE_SHIFTER_E0 wg_LENGTH=100u
```

FIG. 15

1602

/EXPORT/HOME/          /SIMULATION/INTERCONNECT/SCHEMATIC/NE     – □ ✕

FILE  EDIT  VIEW  HELP

* THIS NETLIST IS GENERATED USING OASIS INTEGRATION FRAMEWORK
* SOME OF FEATURES SUCH AS .GLOBAL AND .OPTION HAVE BEEN DISABLED
* FOR MORE INFORMATION CONTACT SUPPORT@LUMERICAL.COM.
* ----------
* GENERATED FOR: INTERCONNECT
* GENERATED ON: FEB 14 15:04:28 2018
* DESIGN LIBRARY NAME:
* DESIGN CELL NAME: PHASE_SHIFTER_EO_TESTBENCH
* DESIGN VIEW NAME: SCHEMATIC
*
* LIBRARY NAME:
* CELL NAME: PHASE_SHIFTER_EO
* VIEW NAME: SCHEMATIC
.SUBCKT PHASE_SHIFTER_EO INØ MODULATOR OUTØ REF
.PARAMETERS wg_LENGTH
1 REF NET5 INØ OUTØ tj_PH18_PHASE_SHIFTER wg_LENGTH=wg_LENGTH sch_X=0.041667 sch_Y=-0.166667 sch_r=0 sch_f=F
.endS PHASE_SHIFTER_EO
* END OF SUBCIRCUIT DEFINITION.
*
* LIBRARY NAME:
* CELL NAME: PHASE_SHIFTER_EO_TESTBENCH
* VIEW NAME: SCHEMATIC
I0 NET01 NET4 NET02 NET03 PHASE_SHIFTER_EO wg_LENGTH=100u sch_x=-0.229167 sch_y=-0.041667 sch_r=0 sch_f=F

SHARED PORTS

METHOD AND SYSTEM TO IMPLEMENT A COMPOSITE, MULTI-DOMAIN MODEL FOR ELECTRO-OPTICAL MODELING AND SIMULATION

CROSS-REFERENCE TO RELATED APPLICATIONS

This application is a continuation application of U.S. application Ser. No. 17/572,454, entitled "METHOD AND SYSTEM TO IMPLEMENT A COMPOSITE, MULTI-DO-MAIN MODEL FOR ELECTRO-OPTICAL MODELING AND SIMULATION", filed Jan. 10, 2022, which is a continuation application of U.S. application Ser. No. 16/231,477, filed Dec. 22, 2018, now U.S. Pat. No. 11,256,841, which claims the priority of U.S. Provisional Application No. 62/639,469, filed Mar. 6, 2018, are of which are herein incorporated by reference in their entirety.

BACKGROUND

The modern process to implement an electronic design is typically performed with computer aided design (CAD) tools or electronic design automation (EDA) systems. To design a circuit, such as an integrated circuit (IC), a designer first creates high level behavior descriptions of the IC device using a high-level hardware design language (HDL). An EDA system typically receives the high level behavioral descriptions of the IC device and translates this high-level design language into netlists of various levels of abstraction. Essentially, the process to implement an electronic device begins with functional design and verification, proceeding to physical design of a layout and verification, and followed by product manufacturing. With regards to verification of an electronic design, a common method of verification is the use of simulation. Simulation dynamically verifies a design by monitoring behaviors of the design with respect to test stimuli. For many types of designs, simulation can and should be performed during the design process to ensure that the ultimate design goals are achievable and will be realized by the finished product.

This typical process to implement and verify an electronic design becomes much more complicated when directed to integrated photonic products. This is because photonic devices that generate and manipulate light have operational parameters which are directly affected by properties of multiple material domains of the constituent components of the photonics device, including some or all of electrical properties, optical properties, thermal properties, and/or mechanical properties.

Consider a photonic device that implements light as an information carrier. This type of photonic device may be highly (first order) sensitive to certain material properties such as temperature, charge density and stress. For example, a typical Mach-Zehnder modulator is made by using the plasma dispersion effect in a PN junction made inside an optical waveguide to modify the free carrier density which in turn modifies the effective index of the optical waveguide, thereby modifying the phase of the light at the output of the waveguide. Using a Mach-Zehnder interferometer configuration, this modulation of the phase can be changed into a modulation of the amplitude of an optical signal (through constructive & destructive interference). In a typical device, a 1V bias across the diode can cause a change in refractive index on the order of 4e-5 and this is sufficient to modulate an optical signal for transceiver applications. At the same time, a change of 1-degree C. can cause a change in refractive index on the order of 2e-4 which is five times larger than the plasma dispersion effect used to modulate the signal. This high sensitivity to multiple material properties causes the simulation problem to move towards a multi-physics problem.

Conventional approaches to implement simulation for these types of photonic devices all suffer from various inadequacies. For example, one conventional approach is to perform sequential (independent) simulations on the different domains. Sequential simulation is based on the idea that an electro-optical system can partitioned into electrical and optical partitions, where there is no feedback loop between these two partitions. In this simulation method, the loading effect of the optical partition on the electrical one is modeled by electrical equivalent representation of the optical components, and the current generated by optical partition is represented by current sources in the electrical partition. Having no feedback loop, the optical and electrical partitions can exchange simulation results using waveform exchange, with each partition being simulated independently.

A significant drawback of the sequential simulation approach is that it requires the design being simulated to be viewed like a one directional flow of information. No feed-back loops or bidirectional coupling can be implemented in this type of simulation. This not only removes the ability to simulate one of the key control methods in modern engineering but also simplifies the models to the extent that they do not properly represent the physical phenomena of the underlying system. Sequential simulation is a specific and limited example of mixed-mode co-simulation that can only be applied to very narrow set of application areas.

Another conventional approach is to implement mixed-mode co-simulation. For example, system level simulation can be performed where two or more circuits are cosimulated by exchange of signals during the simulation, or where digital/analog cosimulation is performed. A key characteristic of these subsystems is that they do not overlap each other physically. As another example, some tools may implement each subsystem to belong to a different modeling domain (digital or analog), where the interface between the subsystems needs to model the change of domain (e.g., by including additional interface elements placed at the D→A and A→D interfaces). Yet another example approach pertains to a system level co-simulation that includes an additional step of filtering signals that pass between different simulation blocks.

However, these known approaches to implement mixed-mode co-simulation also suffer from various limitations. For example, the existing system level co-simulation approaches are incapable of effectively dealing with the challenge of simulating optoelectronic components because it is not possible to isolate the physical phenomena happening in those components into different subsystems that can be individually simulated. In other words, photonic circuits and systems have a tight coupling between electrical, optical and thermal domains, where individual components contribute to both the electrical, thermal and optical simulations. For example, the temperature changes the optical transmission properties of the medium (affects the propagation of an optical signal); the light (photons) propagating is partially absorbed by materials and can generate electrical (photo) currents in the medium as well as heat; and Joule heating associated with an electrical resistance can be used to modify the temperature of the device, affecting in turn the light propagation properties.

Another known approach is to use a single simulator with no partitioning of electrical and optical schematic and netlist, and where the circuit is solved using a single solver and a self-consistent approach for optical, electrical and thermal.

However, solutions within a single simulator are not a sufficient solution because they do not allow for separation of the physical effects in an efficient manner. For example, thermal, optical and electrical effects can occur on vastly different time scales and generally should be handled with different time steps and time scales. In addition, trying to handle all effects within a single behavioral model generally leads to either a more approximate solution or a more inefficient simulation. Moreover, solutions within a single simulator often lead to fundamental limitations with scalability. For example, implementing optical interconnects within certain single-simulators may require each bidirectional optical waveguide and channel to be represented by multiple connections between elements, which is not easily extensible as the number of modes and channels is increased. Furthermore, as new physical effects are considered, it becomes increasingly cumbersome to add them into the existing single simulator models (causing ongoing maintenance problems). Therefore, the single simulator solution is not extensible, scalable, efficient or accurate enough for the vast majority of optoelectronic simulation problems.

Yet another possible approach is to implement mathematical modeling, which involves a higher-level system level description of a system. Because of that, it represents a mathematical abstraction of the components, where full blocks of the system are represented as a single behavioral model, getting very remote from the actual physics of the devices, and the devices themselves. These approaches may treat the system as a unidirectional set of blocks where the transfer function output of each block can be fed into the next block.

While this approach allows for very high-level simulations that are technology/process independent, the problem is that this approach will not encompass some of the detailed physical effects that are needed for effective simulations. Photonics designers that have attempted to construct complex MATLAB simulations to model the theoretical behavior of systems have pushed the modeling level down to the individual device level, which is significantly complicated to the point of causing the same types of extensibility, scalability, and maintenance problems that exist for the single simulator approach described above. In addition, creating more complex circuits and systems that cannot be represented as a unidirectional sequence of transfer functions is challenging with this approach.

Therefore, there is a need for an improved approach that that can adequately address these problems with the conventional tools.

SUMMARY

Embodiments of the invention provide an improved method, system, and computer program product to implement simulation for photonic devices, circuits and systems. Some embodiments pertain to a composite, multi-domain simulation model, with connected domain-specific representations that allow the use of the most relevant simulator technology for a given domain. The model has external connection points either expressed as actual ports or virtual ones, embodied by simulator API calls in the model. In addition, coupling of the different domain representations is realized, again by actual ports or simulator API calls.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 12 illustrates a schematic view and a symbol view of a sub-circuit according to an embodiment of the disclosure;

FIG. 13 shows an example netlist portion of a sub-circuit according to an embodiment of the disclosure;

FIG. 14 shows a top level component as a simple symbol view with all internals hidden according to an embodiment of the disclosure;

FIG. 15 shows an example electrical top level netlist according to an embodiment of the disclosure;

FIG. 16 shows an example optical netlist according to an embodiment of the disclosure;

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The present invention provides an improved approach to implement simulation for photonic devices. In particular, some embodiments pertain to a composite, multi-domain simulation model, with connected domain-specific representations that allow the use of the most relevant simulator technology for a given domain. The model has external connection points either expressed as actual ports or virtual ones, embodied by simulator API calls in the model. In addition, coupling of the different domain representations is realized, again by actual ports or simulator API calls.

Figure 1:
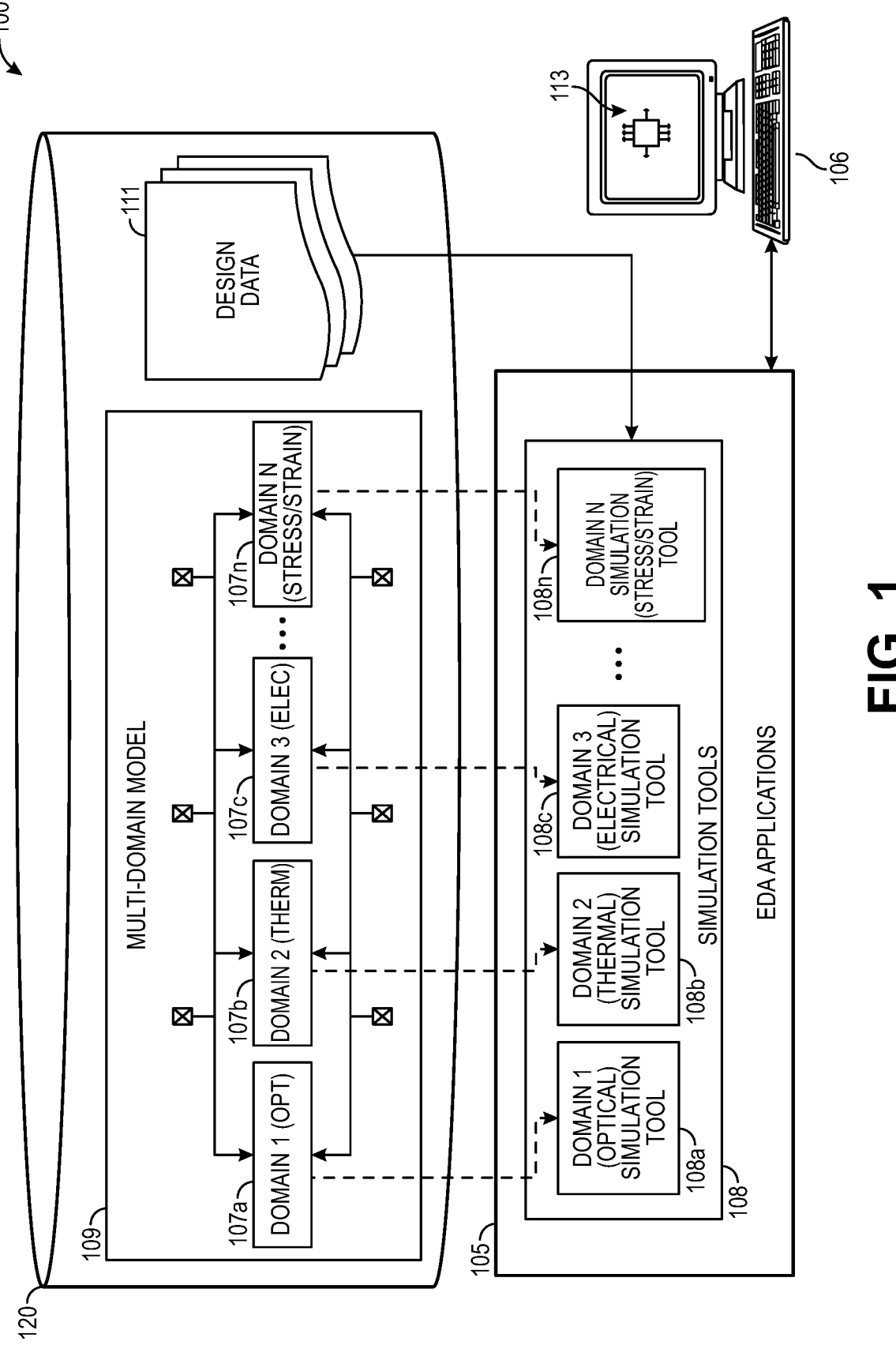
FIG. 1 illustrates an example system employed in some embodiments of the simulation for photonic devices.

FIG. 1 illustrates an example system 100 which may be employed in some embodiments of the invention to implement simulation for photonic devices. System 100 may include one or more users that interface with and operate a computing system to control and/or interact with system 100. Such users include, for example, design engineers or verification engineers. The computing system 100 comprises any type of computing station that may be used to operate, interface with, or implement one or more EDA applications 105. Examples of such computing systems include for example, servers, workstations, personal computers, or remote computing terminals connected to a networked or cloud-based computing platform. The computing system may comprise one or more input devices for the user to provide operational control over the activities of the system 100, such as a mouse or keyboard to manipulate a pointing object.

The electronic, photonic or other design data 111 and/or simulation model 109 may be stored in a computer readable storage medium 120. The computer readable storage medium 120 includes any combination of hardware and/or software that allows for ready access to the data that is located at the computer readable storage medium 120. For example, computer readable storage medium 120 could be implemented as computer memory and/or hard drive storage operatively managed by an operating system, and/or remote storage in a networked storage device, such as networked attached storage (NAS), storage area network (SAN), or cloud storage. The computer readable storage medium 120 could also be implemented as an electronic database system having storage on persistent and/or non-persistent storage.

The simulation model 109 is a single model that nonetheless includes representations for multiple different domains. Any domain for which simulation may need to be performed in an integrated manner with other domains can be represented within model 109. For example, the specific model 109 illustrated in FIG. 1 includes a first domain 107a that provides a representation of the device design in the optical domain. In addition, model 109 includes a second domain 107b that provides a representation of the device design in the thermal domain, a third domain 107c that provides a representation of the device design in the electrical domain, with any additional domains n as necessary.

The general idea is that since model 109 is a composite multi-domain model with separate domain representations, this allows each of the domain representations to be separately simulated using a simulation tool that is appropriate for that domain type. As illustratively shown in FIG. 1, the optical domain representation of domain 107a can be simulated using an optical simulation tool 108a, the thermal domain representation of domain 107b can be simulated using a thermal simulation tool 108b, and the electrical domain representation of domain 107c can be simulated using an electrical simulation tool 108c.

Importantly, despite the fact that separate simulation tools may be used for each domain, cohesive integration of the different simulations may be achieved since the multiple domains representations are all part of a single model 109. The model 109 includes connections points between the different domain representations. The different domain portions may include connection points to deliver electrical and/or thermal information between the different domain-specific simulation models. For example, coupling of the different domain representations can be realized by actual ports or simulator API calls. In addition, the model 109 may also include external connection points that may be accessed by one or more of the simulator tools. For example, one of the simulation tools may be designated as a "master" tool that calls upon the other simulation tools as "slaves". The master may use the external connection points to access the model, where the connection points are expressed as actual ports or virtual ones. As discussed in more detail below, simulator API calls may be employed to communicate to, from, and/or between the different model domains/tools.

Co-simulation is accomplished by allowing each simulator/solver to simulate its own domain specific representations, and communicate (bi-directionally, i.e., push and pull) quantities representing voltage, current, power, temperature, mechanical bend, etc. between all the specified connecting nodes within the composite model through the top level "master" simulator.

To the end user at user station 106, the composite multi-domain device is presented as a single fully self-contained object (a symbol 113 in a schematic editor for example), that exposes all the explicit connection ports. Implicit connections (such as thermal observer ports for example) will appear in the system level netlist, as a result of the netlisting procedure.

Since the inventive model is a single model that includes the multiple domain representations, this approach therefore solves the key problem of the system level cosimulation solutions which is that the different domains cannot be coupled within a single element or sub-circuit. In addition, the inventive approach solves the challenges of extensibility, scalability, efficiency and accuracy inherent to developing the full solution within a single simulator, since each domain representation in the inventive model can be separately developed and simulated. Moreover, each domain specific model can be calibrated based on experimental measures and/or physical level simulation.

Figure 2:
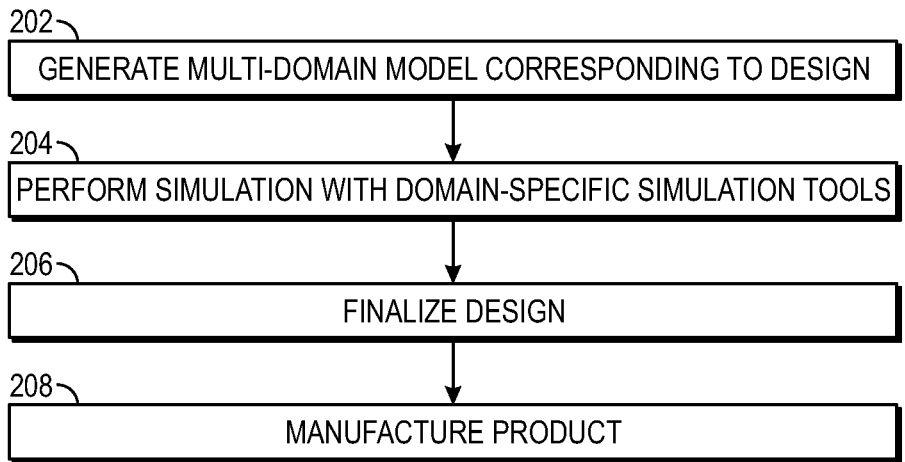
FIG. 2 shows a flowchart according to some embodiments of the disclosure.

FIG. 2 shows a flowchart of an approach to implement some embodiments of the invention. At 202, a composite multi-domain model is generated for the photonic device/product that is being designed. As previously discussed, the composite multi-domain model includes representations for each domain of interest for the design/simulation activities. For example, the composite multi-domain model may include an optical representation, an electrical representation, a thermal representation, and/or a mechanical representation. The domain-specific views can be created for each of the domains of interest, which are then assembled into the complete representation/model.

At 204, simulation of the composite models is performed with a plurality of domain-specific simulation tools. In particular, each simulator/solver is allowed to simulate its own domain specific representations, and communicate (bi-directionally, i.e., push and pull) quantities representing voltage, current, power, temperature, mechanical bend, etc. between all the specified connecting nodes within the composite model.

In one embodiment, a top level "master" simulator is employed to coordinate the simulation activities between the different individual slave simulators. In an alternate embodiment, the multiple simulation tools operate as peer simulators, with coordinated communications occurring between them to simulate the device/product design.

As will be discussed in more detail below, the data exchange between the simulators can be implemented using specialized APIs that permit data to be pushed and pulled between the different simulators. This allows the appropriate data at specific timesteps to be delivered from one simulator to another.

After simulation has been performed, the photonic design can be finalized at 206. This step takes any design actions as necessary to modify the design to correct and resolve any errors or problems that may have been identified from the simulation results. Thereafter, at 208, the photonic product is manufactured according to the finalized design.

Illustrative Embodiment

This portion of the disclosure will now provide an illustrative embodiment of the invention, as applied to the photonics domain. In particular, this illustrative embodiment is directed to a spatially large Mach-Zehnder modulator (MZM). The spatial size is important here because it allows illustration of the spatial x,y dependency and connection points.

As discussed earlier, the composite multi-domain model includes a plurality of domain-specific views. For the purposed of illustration, it is noted that internal to the MZM are models such as:

optical models (PIN phase shifters, thermal phase shifters, y-splitters, directional couplers, PIN photodiodes and TIAs), electrical models (RC circuits), thermal models (thermal equivalent circuits represented as thermal sources, thermal impedance, thermal capacitance).

Figure 3:
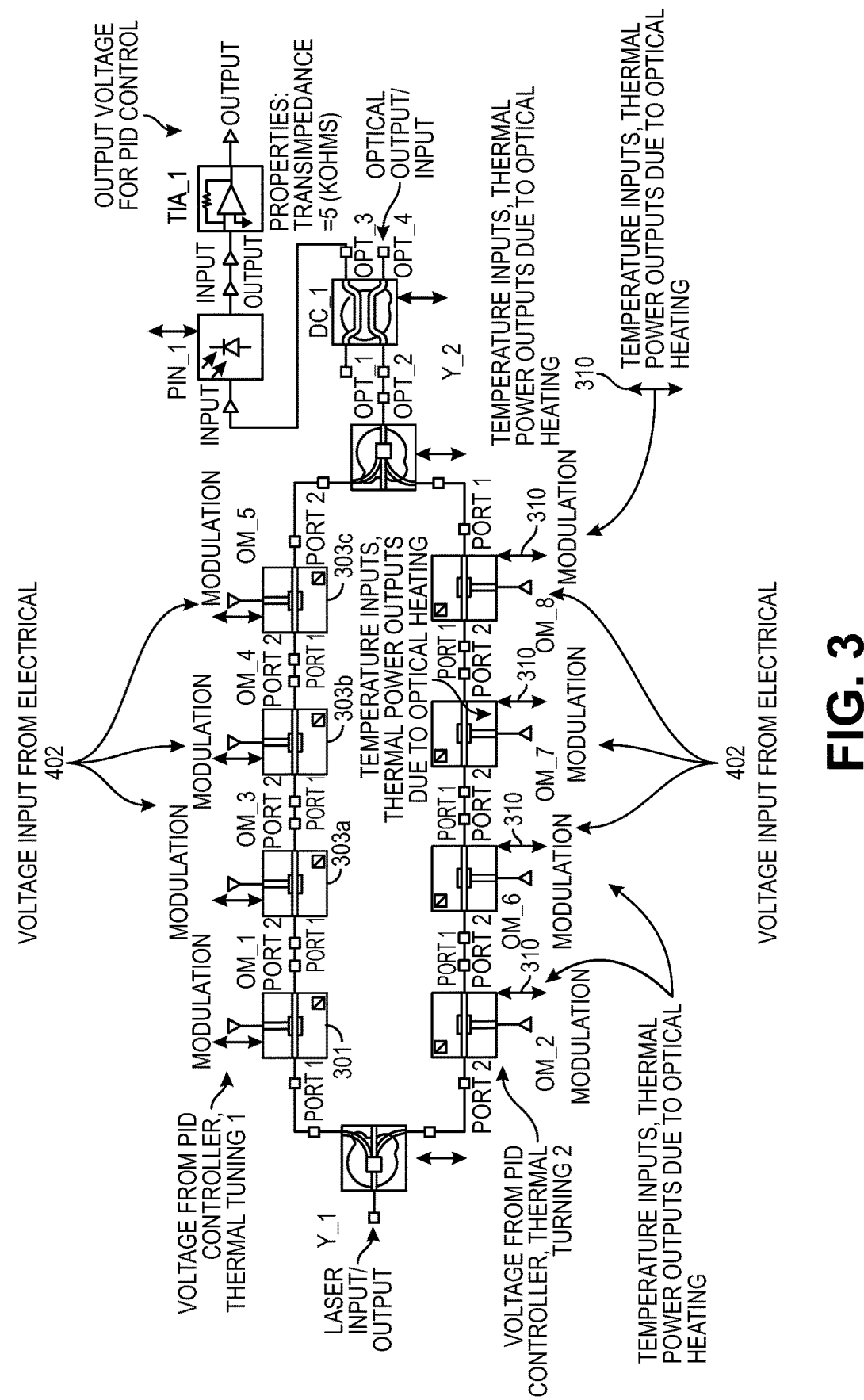
FIG. 3 shows an example internal optical netlist according to an embodiment of the disclosure.

FIG. 3 below shows an example internal optical netlist in the form of a schematic and core models for the MZM. It is composed of a y-splitter, feeding, in each arm, a thermal phase shifter, then 3 electrical phase shifters, before the light is recombined in another y-splitter. There is a directional coupler to tap a small amount of the outgoing signal to be fed into a photodiode (PD) and trans-impedance amplifier (TIA) that will create a voltage output for the component. The thermal and electrical phase shifters take a voltage input (that should come from the electrical simulator) and a thermal input (from the thermal simulator). Note that the thermal connections are drawn differently, indicating that they will be implemented as API calls based on the special location of the actual device.

One or more (electrical phase shifter) devices are represented in a separated manner at both the top and bottom portions of this model. For example, device 301 corresponds to a modeled portion of a waveguide used for thermal controls and devices 303a, 303b, and 303c corresponds to a waveguide being modeled. It should be noted that the figure is illustrating the situation where a single physical device/component (a single waveguide) is being modeled as multiple (three) modeled devices 303a, 303b, and 303c. This is to represent the possible fact that the single photonic component may be long enough such that it needs to be modeled separately along its length due to differing physical characteristics at different portions of the component, such as for example, gradients/changes along the length of the component based upon thermal changes (e.g., temperature), mechanical changes (e.g., stress/strain), and/or electrical changes (e.g., voltage/current changes along a microwave strip line). The splitting of a physical component into multiple modeled devices therefore allows localized modeling along the length of the physical device being modeled. Here, the left portion of the physical component represented by the left-most modeled device 303a in the chain of three modeled devices may be far enough away from the center and right portions of the physical device represented by the center 303b and right-most 303c modeled devices such that they have differing thermal properties, and hence the need to have separate thermal connection points 310 for each of the three top and bottom portions of the physical devices(s). Here, electrical input 402 is applied to each of those three top and bottom modeled devices to represent the electrical connections to/from those modeled devices, where since they actually correspond to the same single component, the same voltage is applied to all three modeled devices. While this figure particularly illustrates a single physical component being split into three modeled devices, it is noted that a physical component may be modeled as any number of modeled devices as necessary for the specific size and characteristics of the component being modeled.

In the current example, the same modeling primitives 303a, 303b, and 303c are used to represent the different portions of the same component being modeled. However, it is noted that the invention in some embodiments may employ different modeling primitives, e.g., in the situation where there are significant physical or design changes at different portions of a component being modeled.

Figure 4:
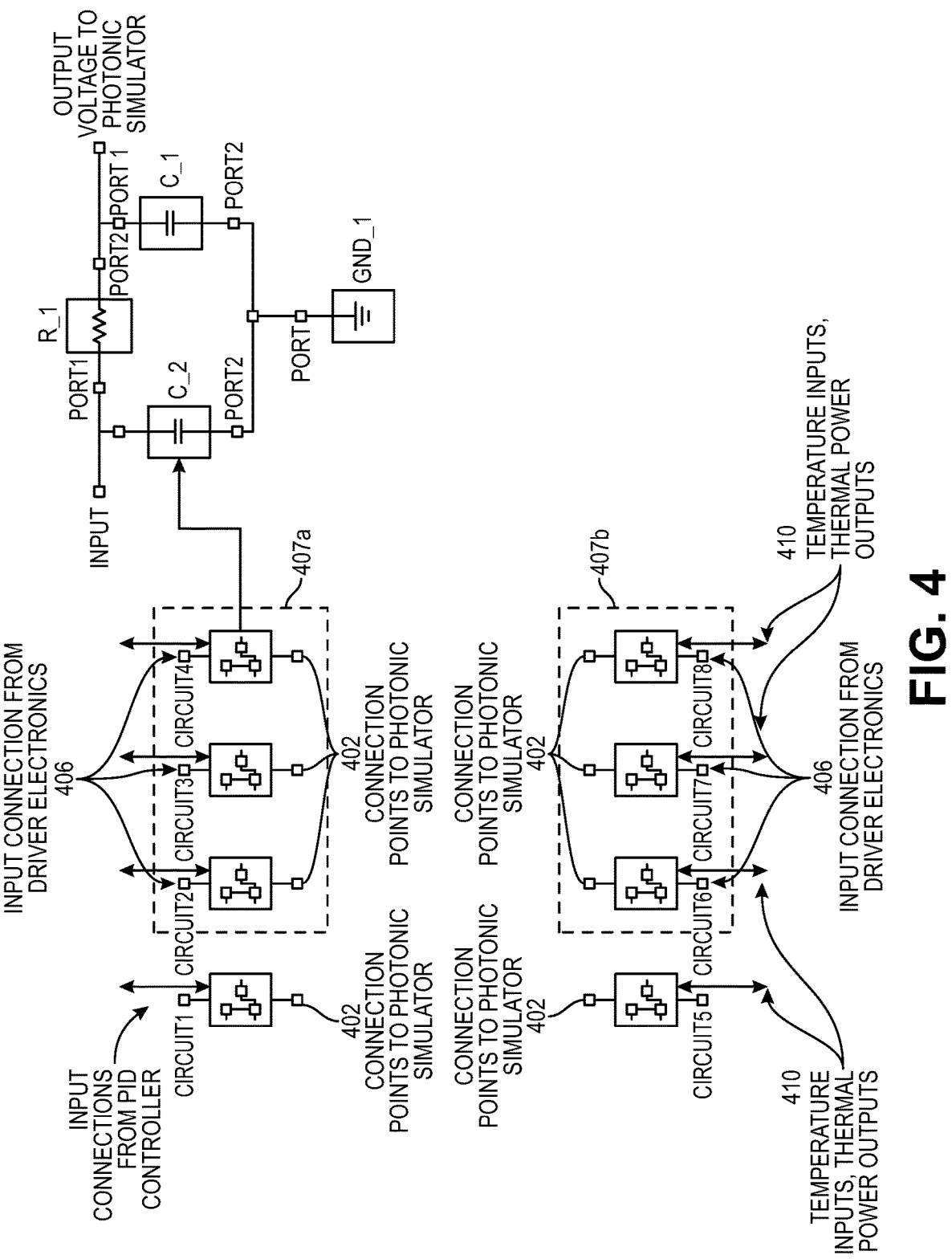
FIG. 4 shows an electrical view of a photonic device as shown in the optical view of FIG. 3.

FIG. 4 shows an electrical view of the same photonic device shown in the optical view of FIG. 3. In particular, the model may include representations of the electrical components that control the operation of the photonic device, e.g., diodes that affect the light emission characteristics of light, where electrical signals applied to the PN or PN junction affect how light is propagated/transmitted through a waveguide.

Here, it is noted that this representation is actually a hierarchical representation, with the same sub-circuit representing the electrical behavior for each phase shifter as a RC network. It is further noted that there is no limitation in the type of devices that can be used in that view, in term of active (transistors) vs passive, ideal or actual, since the standard electrical simulator will be used to simulate that part.

Each of the modeled devices across the top and bottom portions include input connections 406 for driver electronics as well as thermal inputs 410 (e.g., from the thermal model). In addition, the modeled devices also include connection points 402 to the photonic simulator, e.g., to model effects of loading for the electrical signal and/or electrical current generated by light transmission through the photonic device.

Figure 7:
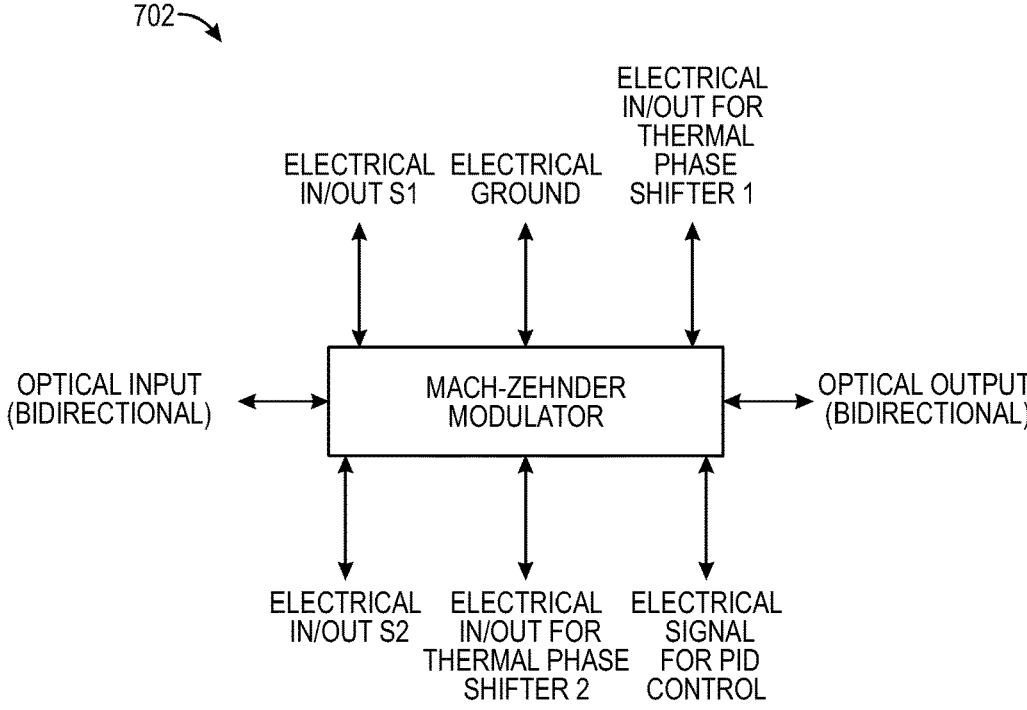
FIGS. 7 and 8 show example user views of a component according to an embodiment of the disclosure.

As previously discussed with reference to the model of FIG. 3, a single component was split into three separate modeled devices, due to the possible fact that the single component may be long enough where it needs to be modeled separately along its length due to differing characteristics at different portions of the component. As such, the model shown in FIG. 4 also represents the single physical component as three modeled devices 407a and 407b. However, since the electrical model is really representing a single physical device as three modeled devices 407a and 407b, these modeled devices can be shorted together in the model at connection points 402. This is also represented in FIG. 7 where there is a single electrical ground and a single electrical in/out S1 shown in that figure for the single physical component, although those single connections are internally split for as many respective modeled devices as are required.

Figure 5:
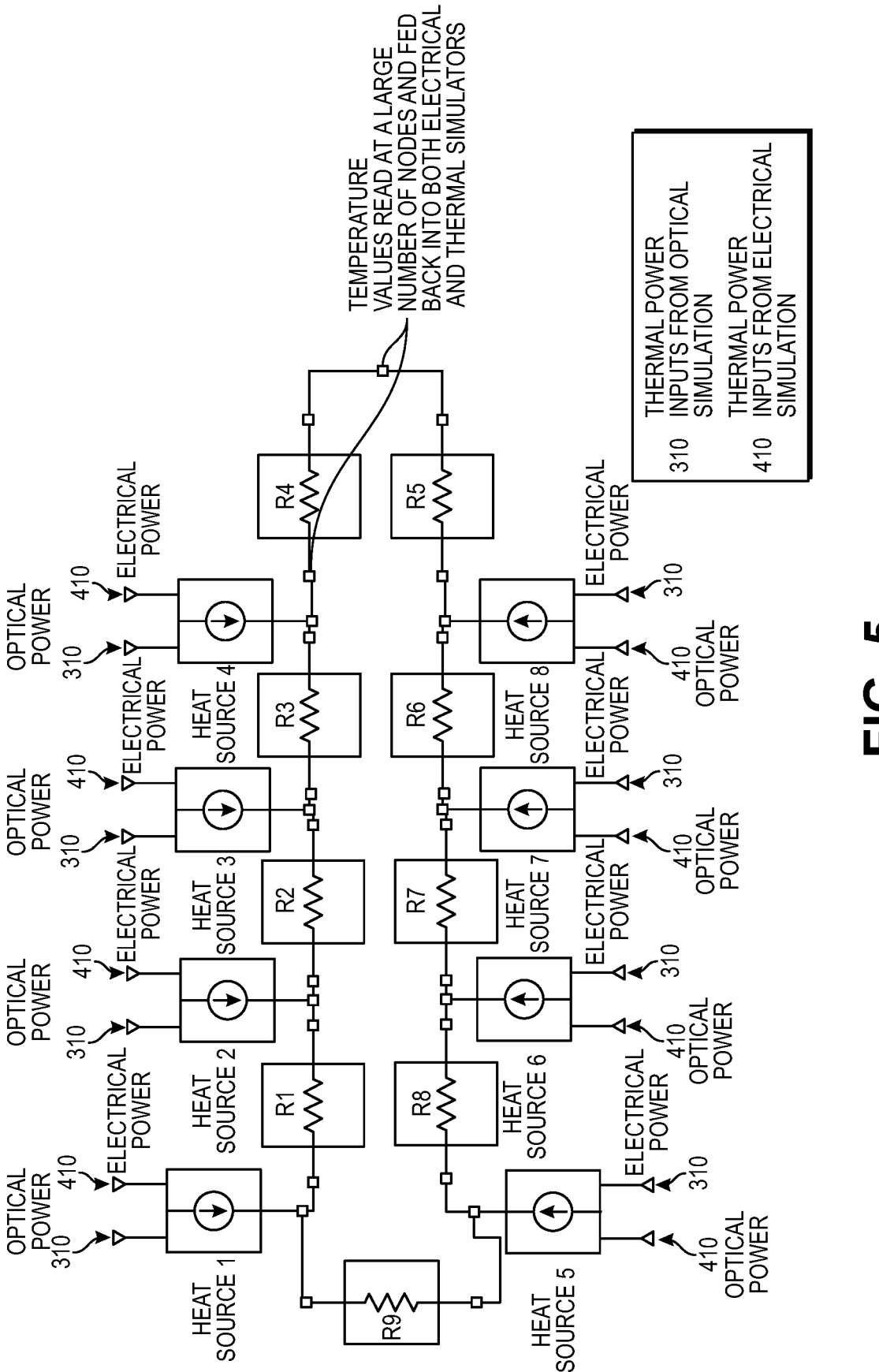
FIG. 5 shows a thermal view of a photonic device according to an embodiment of the disclosure.

FIG. 5 shows the thermal view of this same MZM component. It is noted that of the thermal network required to model the device local effects are captured in the model. In this illustrative example, the thermal network is modeled as a set of resistors representing the thermal resistance of parts of the device/product, while current sources represent the heat sources (power). The thermal network can be modeled very much like an electrical network, and the end user "pretends" that the voltage and current in the circuit represent difference of temperature and temperature flux. For that reason, the thermal network simulation can often be run with the same simulator that is used for the electrical model.

This thermal model in FIG. 5 shows a thermal view of the exact same photonic device shown in the previous optical view and electrical view. However, this model includes inputs (310 and 410) for the thermal power to/from both the electrical simulation and the optical simulation.

Other views can also be added as well. For example, a mechanical stress view, e.g., for a flexible polymer based optical component, can also be implemented. What is important is not the number of views, but rather that the views are connected together internally and externally. Hierarchical parameter passing may be employed, and when supported by each individual simulator, is covered by this use model, as well as the fact that parameters can be passed down into the views and combined in expressions in lower hierarchical levels.

Figure 6:
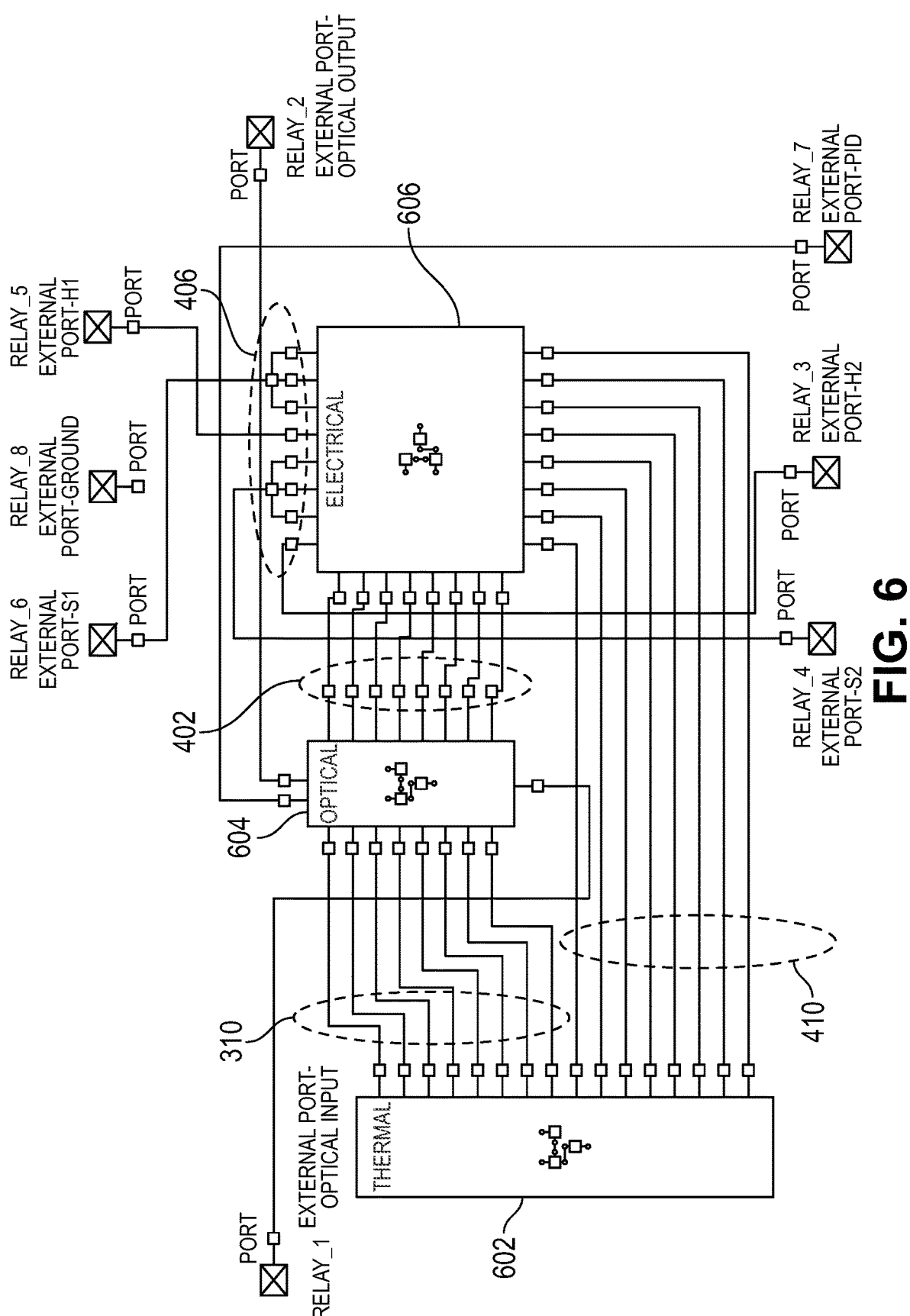
FIG. 6 shows a complete composite model connecting different domain specific views.

As shown in FIG. 6, the complete composite model can be obtained by connecting appropriately through a top-level netlist (or schematic) the different domain specific views. Here, FIG. 6 includes a first portion 602 for the thermal view, a second portion 604 for the optical view, and a third portion 606 for the electrical view. Note that all nodes that are visible to more than one simulator need to be exposed in the top-level view.

The different connections that were shown in the individual views of FIGS. 3-5 are represented in FIG. 6 to tie together the different domain models. For example, the thermal connections 310 shown in FIGS. 3 and 5 are also represented in FIG. 6 to connect the thermal portion 602 with the optical portion 604. Similarly, the thermal connections 410 shown in FIGS. 4 and 5 are also represented in FIG. 6 to connect the thermal portion 602 with the electrical portion 606. For the electrical connections, connections 402 shown in FIGS. 3 and 4 are also represented in FIG. 6 to connect the optical portion 604 with the electrical portion 606. Electrical connections 406 shown in FIG. 4 are also represented in FIG. 6 to connect the electrical portion 604 with the external ports.

One should also note that provided each domain simulator has such capability, each domain view can be encrypted to enable delivery of the IP in a protected manner.

Figure 8:
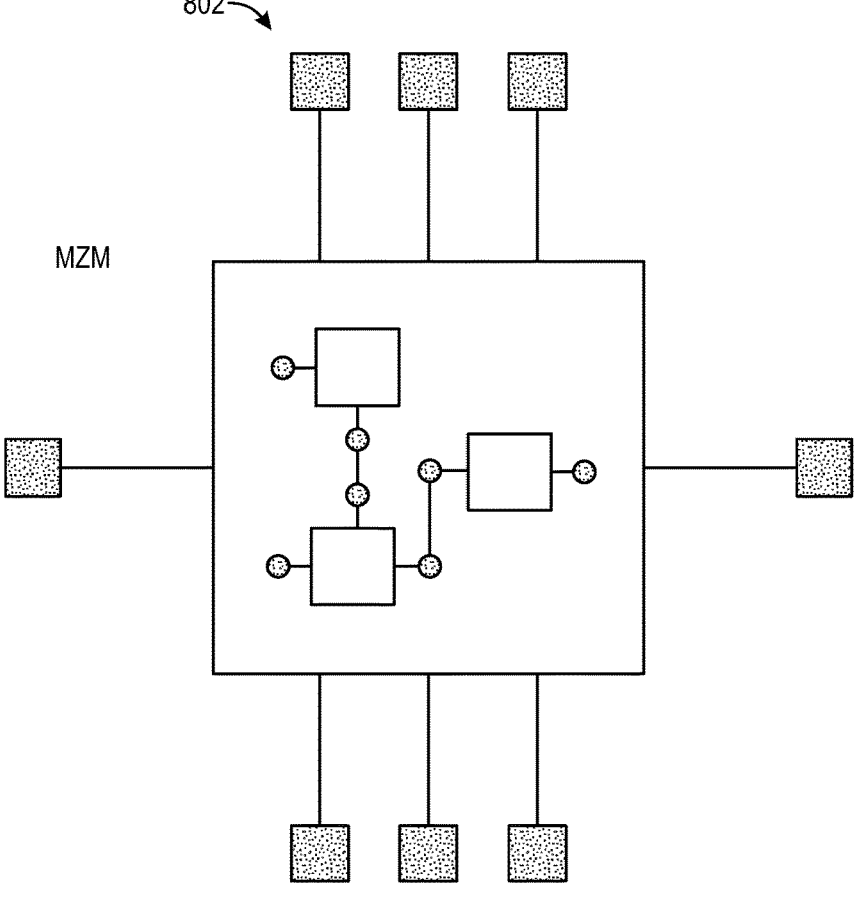

FIGS. 7 and 8 show example user view(s) 702 and 802 of the component. View 702 illustrates connection points and signals applied to the component. View 802 is a representation that shows the explicit ports. If the editing tool of choice is a graphical schematic editor, the view(s) will have artwork representing the device, and some port(s). If the editing tool is text base, the view will list the ports and potential parameters for the devices.

Note that in this example, the thermal connections are not exposed to the users, as the tool(s) will be reaching into the thermal network through APIs (Virtual API connections)— but the internal nodes have been exposed in the top-level view, making them accessible for an API direct observation/contribution.

As previously noted, during simulation in some embodiments one of the simulator is designated as the master simulator that is in charge of managing the simulation activities. The simulation interaction between the different simulators is affected by performing data exchange between the simulators, where the data exchange is realized using specialized API implementing an "observer" function and an "actuating" function. The master simulator orchestrates the API calls and managing the time steps for performing the simulation. Other domain specific simulators are "slaves" and will observe through their dedicated observer and update through their actuating functions the data in the master simulator. In some embodiments, the observer function from a slave simulator does not modify the data in the master simulator. For example, this means in the electrical domain an observer function monitoring voltage is an infinite impedance on the electrical circuit, in which case the actual load (impedance) of the device must be modeled in the electrical domain, part of the device electrical view.

The actuating function "contributes" to the top-level simulator. For example, a photodiode model can generate a current that contributes to an electrical node. The term contribute is important here and is used as defined in the Verilog-A operator (<+). Care needs to be taken that such contribution is continuous and does not introduce convergence issues.

The above paragraphs explain observing and contributing with electrical quantities, but any of the quantities that are available in the top-level simulator domain can be observed and actuated.

It should be noted that observing or contributing may require the corresponding node to be made visible in the top level simulator-either as a top level node, or, as an internal node of the schematic/sub-circuit used to assemble the different domain specific views.

Time step management instructions can also be pushed/pulled along with the quantities to enable optimization of the synchronization between the domain specific engines. An example will be provided below in the implementation illustration.

Illustrative Implementation

The following portion of the disclosure shows an example implementation.

It is noted that a key differentiation with the existing flows is that the present approach generates a netlist with overlapping elements to place the domain specific parts of a component in the appropriate netlist. Like in the mix-signal flows, netlisting is configuration driven. But unlike in the mix-signal flow, where there is a single configuration, and devices are partitioned in a binary/non-overlapping manner (either digital partition or analog partition), in the current case, there are overlapping partitions which use one configuration per domain. In other words, looking at the partition can only determine the fact that a component belongs to a domain, and one cannot infer from the non-membership to a given partition alone the domain of a component.

To speed up the decision criteria, the present approach applies only this multi-domain netlisting procedure to instances that have been determined (by looking at the signal types of their ports in the database) to be multi-domain (e.g., instances that have at least 1 port with an electrical signal type and 1 port with an optical signal type).

Figure 9A:
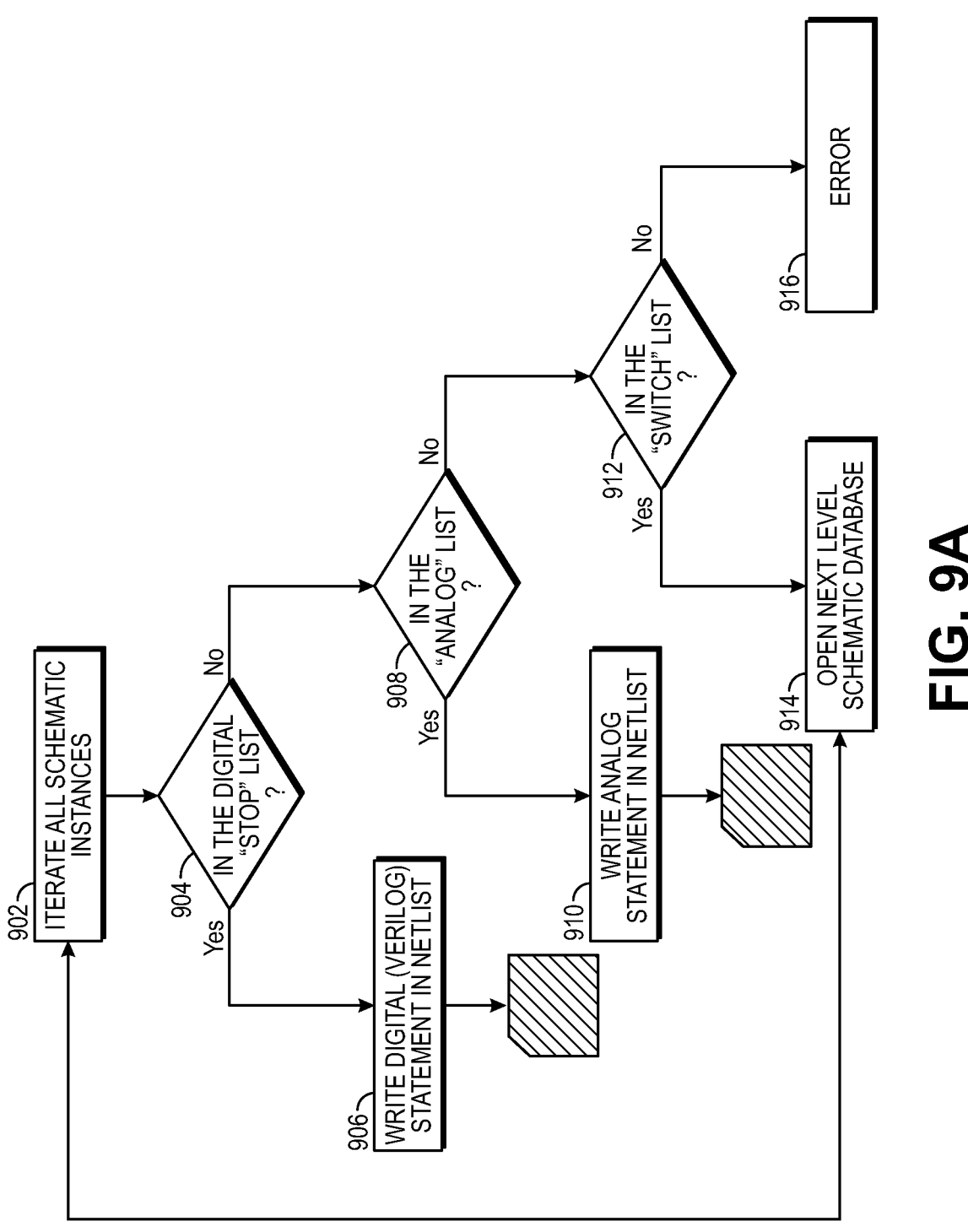
FIGS. 9A and 9B illustrate netlisting approaches for single domain instances and multi-domain instances respectively.

For single domain instances (as determined by port signal types), the netlisting approach of FIG. 9A is applied. At 902, iteration is performed over the schematic instances. At step 904, a determination is made whether the instance is in a stop list. If so, then at step 906, a digital statement is written into the netlist. If not, then a further determination is made at 908 whether it exists in an analog list. If so, then at step 910, an analog statement is written into the netlist. If so, then a determination is made at 912 whether it is in a switch list. If so, then at step 914, the next level of the schematic is opened. If not, then at step 916, an error is produced.

Figure 9B:
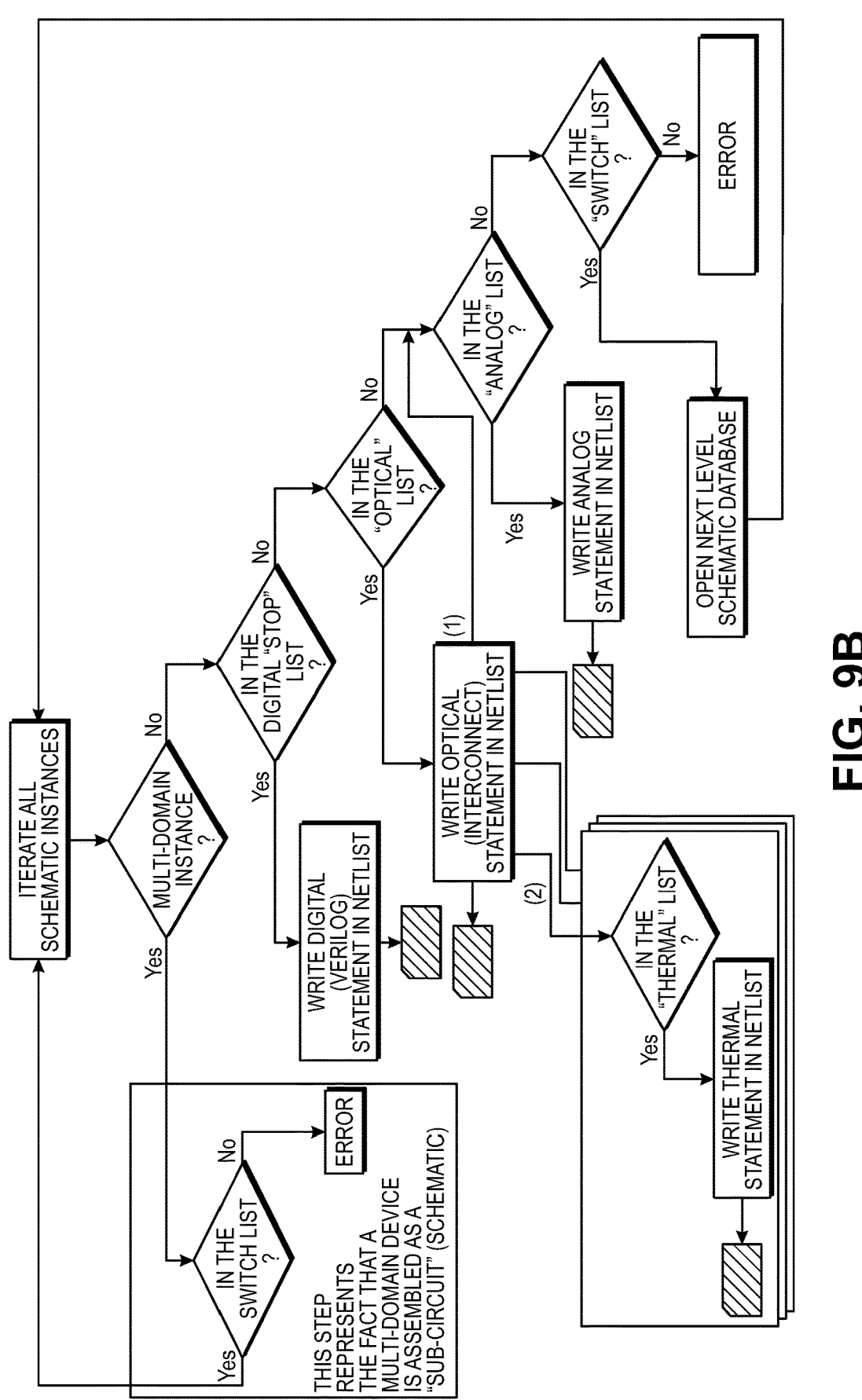

For multi-domain instances, the approach of FIG. 9B is applied. In the multi-domain netlisting flow graph, it is noted that the rectangle in the upper left represents the fact that the domain specific views is assembled through a schematic (netlist). The arrow annotated (1) represents the fact that this is (at the minimum) an Electro-optical device. The arrow(s) annotated (2) represent the other domains. Shown here illustratively is the thermal domain, but other domains such as mechanical/stress or other domains can be added here. In addition, these domain specific netlists can in turn also be hierarchical. It is noted that any suitable final file structure can be employed here. The different domain netlists can be either in multiple files, or all in a single file with multiple "sections" for each domain. In addition, the netlist can be in clear or binary (encrypted or not) format.

The following steps describe how a composite multi-domain model is assembled, for an illustrative optical phase shifter. This model will have both an electrical and an optical domain representation. In addition, the electrical domain view is encrypted (the optical domain compact model is also encrypted).

Figure 10:
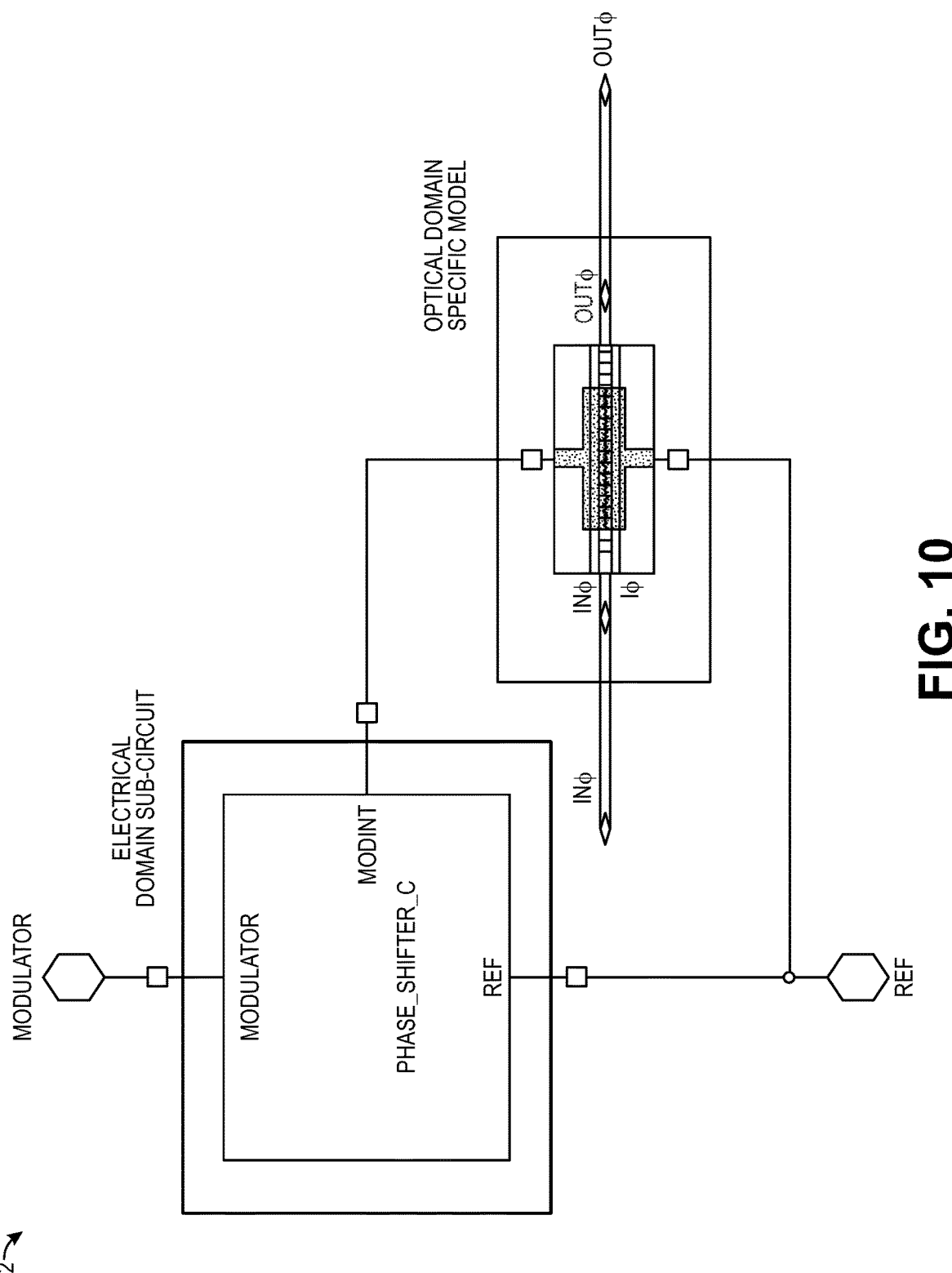
FIG. 10 illustrates a top level Electro-optical cell according to an embodiment of the disclosure.

FIG. 10 illustrates the "top level" Electro-optical cell 1002 in this illustrative example. In this view, which in the example has the form of a Clear Schematic, the domain specific representations are instantiated and connected to each other through signals. Note that connections can be in any form (parallel or serial).

Figure 11:
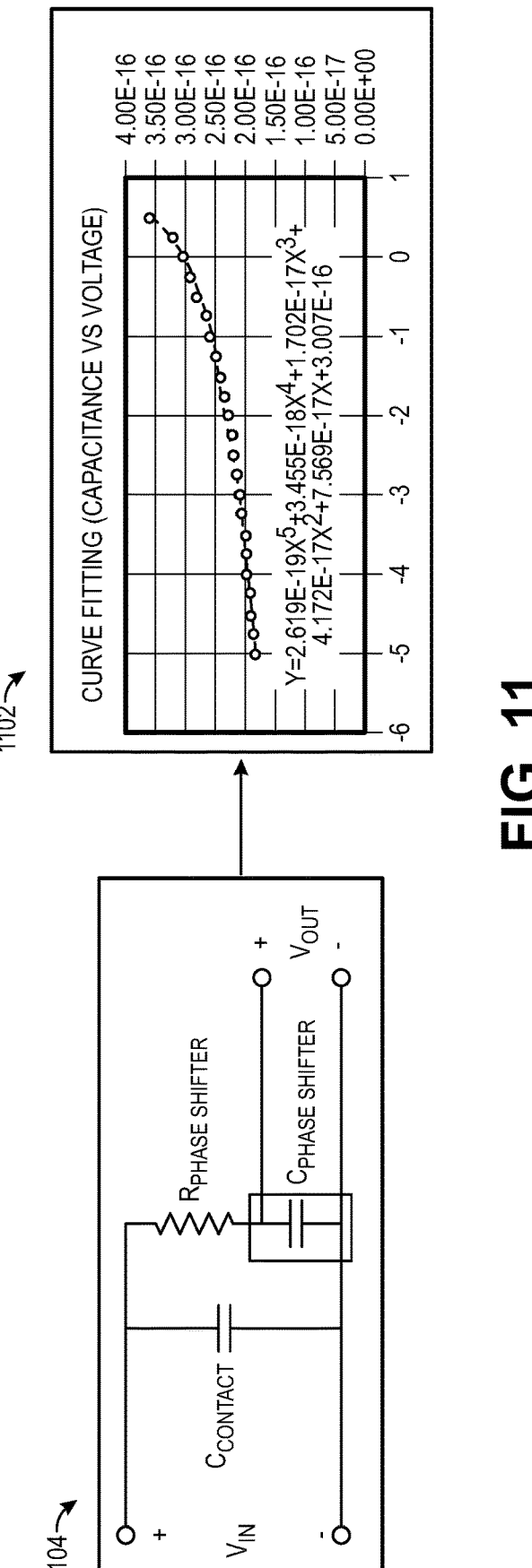
FIG. 11 shows an example sub-circuit with a voltage dependent capacitor and other traditional electrical elements according to an embodiment of the disclosures.

The electrical domain sub-circuit is illustrated in FIGS. 11-13. As shown in FIG. 11, curve fitting 1102 is initially performed to create the electrical model. This figure shows the example sub-circuit 1104, with a voltage dependent capacitor and other more traditional electrical elements. FIG. 12 illustrates a schematic view 1202 and a symbol view 1204 of the sub-circuit. An example netlist portion 1303 is shown in FIG. 13. The netlist is shown in clear for example here, but it is noted that any sub-circuit can be encrypted as well, and a PDK/foundry may want to take advantage of this to obfuscate detailed (confidential) manufacturing data. Such sub-circuits are provided as a text library of encrypted files that is simply included in the netlist. As illustrated in FIG. 14, the top level component in the PDK can be a simple symbol view 1304 with all internals hidden.

FIGS. 15 and 16 illustrate two simulator specific netlists that have been generated showing the cross-connection points. FIG. 15 is the example electrical top level netlist 1502. It is noted how this netlist strips off the optical domain model from the top EO cell (sub-circuit). Now, in looking at the optical netlist of FIG. 16, it is noted how the interface view 1602 in this figure instantiates the optical module and connects it to the shared ports (note "net5" is the auto-named net connecting internally to the top level EO schematic the electrical and optical sub-circuits. All other nets are explicitly named because they also connect to externally visible ports (ref, modulator)).

Figure 17:
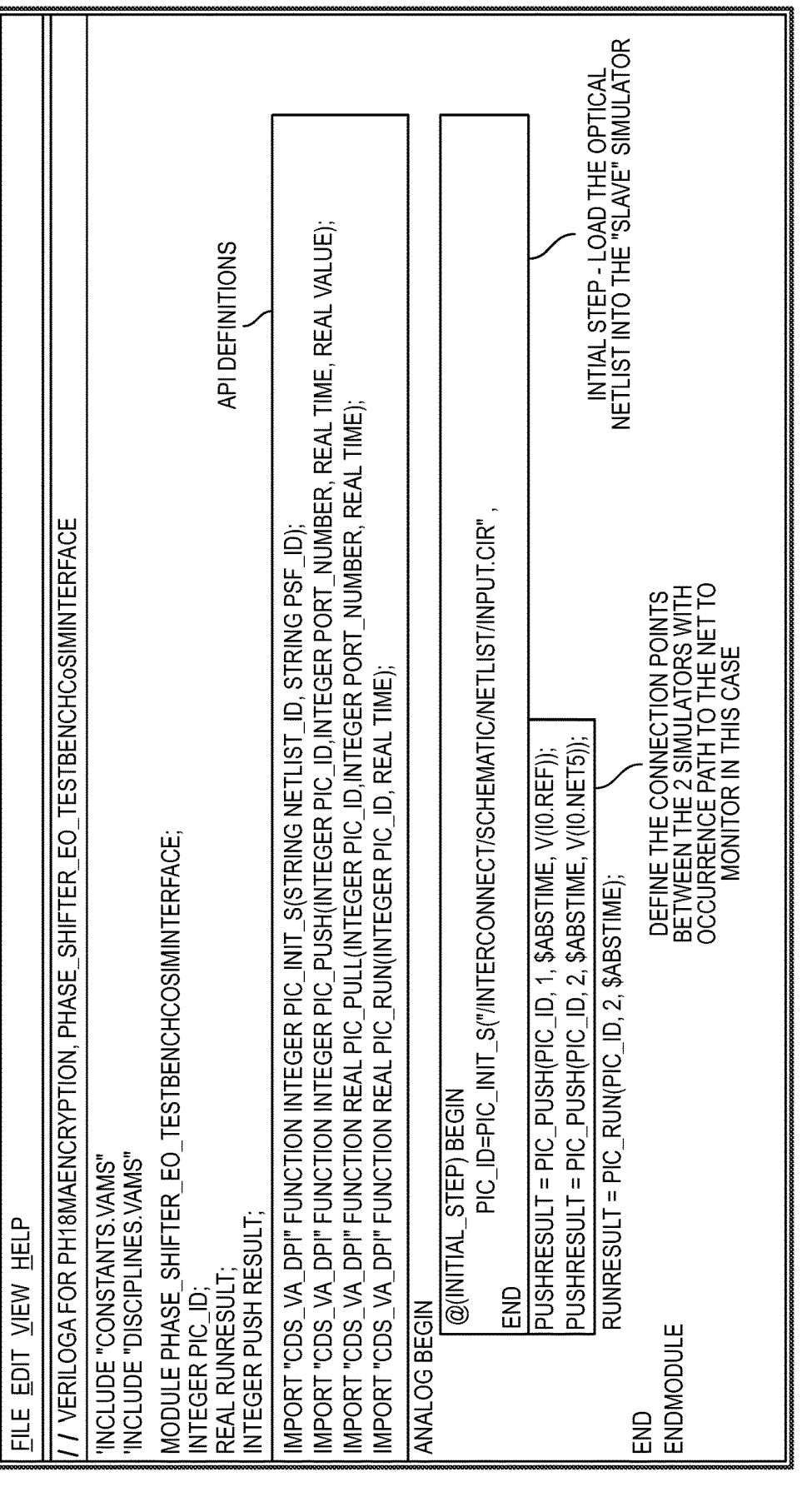
FIG. 17 illustrates push-pull points tagged to a simulator according to an embodiment of the disclosure.

Finally, as shown in interface 1702 of FIG. 17, the push-pull points are represented and tagged to the simulator(s) through Verilog-A DPIs and following the full occurrence path of the shared ports (more on this in next section). In this case, there is PUSH only (electrical side is monitored only) ports. The netlist also shows how the slave simulator (optical domain, optical simulator) provides the API definitions, how they are initialized in Verilog-A, and how the initial optical netlist is loaded into the optical simulator. This module is auto-generated (no end-user intervention) based on the information of the Electro-Optical port gathered during netlisting step.

In the current implementation, supported is the connection between the optical domain representation and the electrical domain, where the electrical circuit simulator is the "master" and the optical simulator is the "slave" simulator.

With regards to simulation, the data exchange between the electrical and optical simulators is implemented using PUSH/PULL commands through the Verilog-A DPI and public APIs. The PUSH and/or PULL commands are called depending on the direction of the port connecting the electrical and optical domains. Time stepping for data exchange between the electrical simulator and the optical simulator can be either synchronized as shown in FIG. 18 at 1802(a), or unsynchronized to reduce the number of samples in one of the domains and thus speed up the simulation, as shown in FIG. 18 at 1802(b). There is no condition on the relative time steps between the simulators, but in the case of unsynchronized time stepping, the driving electrical simulator pushes data to the optical simulator, and then indicates that the optical simulator should run as many steps as possible to catch up (but not exceed) the electrical simulator time step. At this point, if a PULL is requested, optical simulator will return data at the closest available time step. Data can be requested at past time, in which case it is interpolated to the requested time.

As an input port is used, a PUSH statement is generated, and the corresponding optical simulator input port can be an observer only, in the sense that it reads the voltage from the electrical simulator but otherwise behaves as an infinite impedance device where no current flows, and therefore the optical simulator port has no effect on the electrical simulator simulation.

However, when an inputOutput port is used, a PUSH/PULL statement will be generated and the optical simulator port can return a value to the electrical simulator. This is typically the photocurrent created by an optical device such as a photodiode or electroabsorption modulator. In this case, the optical simulator will influence the electrical simulator simulation by acting as a current source. In a typical inputOutout port, the voltage is PUSHED from the electrical simulator to optical simulator and the photocurrent is PULLED from optical simulator to the electrical simulator, while the remaining equivalent circuit is handled directly in the electrical simulator.

There may be a combination of different port types within a single simulation. It is up to the device modeling person to decide which types of ports (input, output, inputOutput) are used to model the electrical interface of an optical device, and which portions of the device are included in the electrical simulator and optical simulator simulations.

This description is provided as an example only, however, it is equally possible to PUSH current and PULL voltage, or devise other, similar schemes to exchange information.

Therefore, what has been described is a single composite simulation model that includes multiple domain representations, which permits co-simulation solutions that allow different domains to be coupled together for a given element or sub-circuit. In addition, this approach provides extensibility, scalability, efficiency and accuracy, since each domain representation in the inventive model can be separately developed and simulated.

In addition, the current approach improves the functionality of a computer that will operate upon the simulation model. The different domain representations can be operated upon by the appropriate simulator for that domain-without having that domain representation include content that is appropriate for the other domains. For example, the thermal simulations can be performed by operating upon the thermal model where that thermal model does not include certain content that may exist in and be appropriate for the electrical model. This means that less memory is required to load the reduced amount of data for any specific simulator for a given domain, reducing memory consumption requirements for the computer system that runs the simulation. In addition, this reduced amount of data means that the computing system will be able to operate upon the data faster and reduce latency times to receive computation results.

System Architecture Overview

FIG. 19 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, nonvolatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:

generating a multi-domain simulation model for a photonic device, the multi-domain simulation model comprising a netlist of elements with connections, the netlist including a first element of a first domain of the model and a second element of a second domain of the model, wherein a same component of the photonic device is represented according to the first element of the first domain and the second element of the second domain, the first element and the second element associated with different physical characteristics of the photonic device;

performing simulation on the multi-domain simulation model via one or more connections connecting the first element and the second element of different domains, wherein the first domain is simulated with a first simulation tool, wherein the second domain is simulated with a second simulation tool, wherein simulation in the first domain and simulation in the second domain are coupled via the first element and the second element, and wherein the first simulation tool is a different domain simulator from the second simulation tool; and generating physical effects for the photonic device based on the simulation of the multi-domain simulation model.

2. The method of claim 1, wherein data exchange between the first domain and the second domain during simulation is realized using an API implementing an observer function and an actuating function.

3. The method of claim 1, wherein one simulation tool corresponds to a master that coordinates simulation activities, and additional one or more simulation tools correspond to slaves.

4. The method of claim 1, wherein the multi-domain simulation model further comprises a domain pertaining to a thermal model or a mechanical stress model.

5. The method of claim 1, wherein the multi-domain simulation model includes a plurality of domain specific views, wherein the plurality of domain specific views are connected together through a top-level of a hierarchy in the netlist.

6. The method of claim 1, wherein a domain view is encrypted.

7. A computer program product embodied on a non-transitory computer readable medium, the non-transitory computer readable medium having stored thereon a sequence of instructions which, when executed by a processor causes the processor to execute a method for performing an analysis of a circuit design comprising:

generating a multi-domain simulation model for a photonic device, the multi-domain simulation model comprising a netlist of elements with connections, the netlist including a first element of a first domain of the model and a second element of a second domain of the model, the first domain and the second domain representing different physical characteristics of the device, wherein a same component of the photonic device is represented according to the first element of the first domain and the second element of the second domain, the first element and the second element associated with different physical characteristics of the photonic device;

performing simulation on the multi-domain simulation model by simulating the first domain with a first simulation tool and simulating the second domain with a second simulation tool, wherein the first simulation tool is a different domain simulator from the second simulation tool, wherein simulation in the first domain and simulation in the second domain are coupled via the first element and the second element, and wherein the simulation of the first domain and the simulation of the second domain are coupled via one or more connections connecting the first element and the second element; and generating physical effects for the photonic device based on the simulation of the multi-domain simulation model.

8. The computer program product of claim 7, wherein data exchange between the first domain and the second domain during simulation is realized using an API implementing an observer function and an actuating function.

9. The computer program product of claim 7, wherein one simulation tool corresponds to a master that coordinates simulation activities, and additional one or more simulation tools correspond to slaves.

10. The computer program product of claim 7, wherein the multi-domain simulation model further comprises a domain pertaining to a thermal model or a mechanical stress model.

11. The computer program product of claim 7, wherein the multi-domain simulation model includes a plurality of domain specific views, wherein the plurality of domain specific views are connected together through a top-level of a hierarchy in the netlist.

12. The computer program product of claim 7, wherein a domain view is encrypted.

13. A system for analyzing a circuit design, comprising:
a processor;
a memory for holding programmable code; and
wherein the programmable code includes instructions for generating a multi-domain simulation model for a photonic device, the multi-domain simulation model comprising a netlist of elements with connections, the netlist including a first element of a first domain of the model and a second element of a second domain of the model, wherein a same component of the photonic device is represented according to the first element of the first domain and the second element of the second domain, the first element and the second element associated with different physical characteristics of the photonic device;

performing simulation on the multi-domain simulation model via one or more connections connecting the first element and the second element, wherein the first domain is simulated with a first simulation tool, wherein the second domain is simulated with a second simulation tool, wherein simulation in the first domain and simulation in the second domain are coupled via the first element and the second element, and wherein the first simulation tool is a different domain simulator from the second simulation tool; and generating physical effects for the photonic device based on the simulation of the multi-domain simulation model.

14. The system of claim 13, wherein data exchange between the first domain and the second domain during simulation is realized using an API implementing an observer function and an actuating function.

15. The system of claim 13, wherein one simulation tool corresponds to a master that coordinates simulation activities, and additional one or more simulation tools correspond to slaves.

16. The system of claim 13, wherein the multi-domain simulation model further comprises a domain pertaining to a thermal model or a mechanical stress model.

17. The system of claim 13, wherein the multi-domain simulation model includes a plurality of domain specific views, wherein the plurality of domain specific views are connected together through a top-level of a hierarchy in the netlist.

18. The system of claim 13, wherein a domain view is encrypted.

19. The system of claim 13, wherein the netlist includes multiple elements corresponding to a plurality of domain specific parts of a component of the photonic device.

20. The system of claim 13, wherein schematic instances are stored in a database for the photonic device, and wherein the netlist is partitioned based on signal types of associated ports of the instances, wherein a multi-domain instance includes a port of electrical signal type and a port of optical signal type.

* * * * *